US011850964B2

(12) United States Patent
Carr

(10) Patent No.: US 11,850,964 B2
(45) Date of Patent: Dec. 26, 2023

(54) SYSTEM TO INTEGRATE SOLAR GENERATED AND BATTERY STORED ENERGY FOR EVCS

(71) Applicant: Fred K. Carr, Myrtle Beach, SC (US)

(72) Inventor: Fred K. Carr, Myrtle Beach, SC (US)

(*) Notice: Subject to any disclaimer, the term of this patent is extended or adjusted under 35 U.S.C. 154(b) by 0 days.

(21) Appl. No.: 17/803,697

(22) Filed: Oct. 17, 2022

(65) Prior Publication Data

US 2023/0052642 A1 Feb. 16, 2023

Related U.S. Application Data

(63) Continuation of application No. 17/300,302, filed on Oct. 9, 2018, now abandoned.

(51) Int. Cl.
| | | |
|---|---|---|
| *B60L 53/51* | (2019.01) | |
| *B60L 53/66* | (2019.01) | |
| *B60L 53/62* | (2019.01) | |
| *B60L 53/50* | (2019.01) | |

(52) U.S. Cl.
CPC ............ *B60L 53/51* (2019.02); *B60L 53/50* (2019.02); *B60L 53/62* (2019.02); *B60L 53/665* (2019.02); *B60L 2210/10* (2013.01); *B60L 2210/40* (2013.01)

(58) Field of Classification Search
CPC ..................................................... B60L 53/51
USPC ............................................................ 320/109
See application file for complete search history.

(56) References Cited

U.S. PATENT DOCUMENTS

| | | | | |
|---|---|---|---|---|
| 2010/0023162 A1* | 1/2010 | Gresak | .................. | G06Q 10/087 705/28 |
| 2010/0039062 A1* | 2/2010 | Gu | ........................ | B60L 55/00 320/109 |
| 2012/0007542 A1* | 1/2012 | Jammer | .............. | H01M 10/465 320/109 |
| 2013/0076294 A1* | 3/2013 | Smith | ....................... | H02J 7/35 320/109 |
| 2013/0080254 A1* | 3/2013 | Thramann | ............... | B60L 53/68 705/14.57 |
| 2015/0306970 A1* | 10/2015 | Son | ......................... | B60L 53/67 701/22 |
| 2017/0028864 A1* | 2/2017 | Gerhold | .................. | B60L 53/11 |
| 2017/0174090 A1* | 6/2017 | Lakamp | ............... | H02G 3/0493 |
| 2018/0358839 A1* | 12/2018 | Perez | ........................ | H02J 3/46 |
| 2020/0067449 A1* | 2/2020 | Corsi Henson | ......... | E04H 6/025 |

* cited by examiner

*Primary Examiner* — Jerry D Robbins
(74) *Attorney, Agent, or Firm* — Fred K. Carr

(57) ABSTRACT

The invention includes a Microprocessor Control Center for controlling an Electric Vehicle Charging Station, and methods thereof, which include a load center for aggregating a charging load from a renewable energy source, a battery stored energy source, and electricity taken directly from the transmission grid when the battery storage depleted. The objective of the system is to maximize the use of the renewable energy source which is used directly and at first priority. The use of an energy storage system prevents local brown-outs which can occur when large amounts of electricity is quickly removed from the grid. The energy storage system is recharged from the grid off-peak when rates and house-hold usage are lowest. In a preferred embodiment, the renewable source is solar power, in other embodiments the renewable source can be wind, tidal and biomass. The solar panels are located on the weather canopy roof at petroleum retail fueling sites.

3 Claims, 5 Drawing Sheets

SYSTEM TO INTEGRATE SOLAR GENERATED AND BATTERY STORED ENERGY FOR EVCS

CONTINUATION APPLICATION

This is a continuation application of application Ser. No. 17/300,302 entitled—Electric Vehicle Charging Station with Solar Component—having a filing date of Oct. 9, 2018.

BACKGROUND OF THE INVENTION

1. Field of the Invention

The present invention relates to a system to integrate and optimize the distribution of photovoltaic (PV) generated energy and battery stored energy (BSE) for forming a charging load in an electric vehicle charging station (EVCS) where the PV generated energy is used directly and at top priority in forming the charging load with supplementation from BSE as needed.

2. Description of the Prior Art

There has recently been a surge of interest in using alternate energy sources to power transportation vehicles. This has been prompted by the public's concern for pollution and the eventual depletion of carbon base fuels presently used by most cars and trucks. After years of discussion and relatively slow development, major automobile manufacturers are finally producing plug-in hybrids and fully electrical vehicles (EV) models for public use. These EVs typically have 50-200 kilowatt-hour (kWh) of energy stored on board which allows for a couple hundred miles of operation depending on terrain and driving conditions. The time needed to fully recharge an EV battery pack depends on the type charger and can range from one to eight hours. An EVCS infrastructure needs to be developed which would allow for longer trips from home and faster charging. While there is a national network of petroleum fueling stations along all major highways, few of these presently have EVCSs.

Most EV batteries are presently charged from AC energy at home which is supplied to the vehicle's on-board charger by common US grounded house receptacles, commonly referred to as a 120 volt outlets. This process is known as Level 1 recharging and requires several hours. The method has fair acceptable since recharging is done at home overnight, however, the method limits the vehicle's use to local driving of short trips. There has been a recent trend where employers and some cities provide access to Level 2 chargers which are faster since they use 220 volt outlets, but still require four to six hours which is acceptable for working or shopping but not traveling. Several companies offer various models of Level 2 charging stations placed at work sites or designated areas in cities which offer features as flexible pricing for time of day, kWh used and wait list programs. Still these require hours for charging, and use totally grid electricity.

A Level 3 charging infrastructure therefore needs to be developed for longer trips, and faster charging. Level 3 chargers use DC energy from off-board chargers which provide up to 50 kWh energy (300-600 V DC) providing a "quick" recharge. Quick charge systems require a powerful DC electricity supply and suitable connectors as a SAE J1772-2009 connector which can provide around 18 kWh or VDE-AR-E 2623-2-2 connectors which can provide up to 45 kWh. Recharging typically takes a battery pack from around 10% to 80% battery capacity. As an example, taking a 50 kW battery pack from 10% to 80% capacity would require 35 kW energy which if provided by a 18 kW supply would take about 2 hours. Having several quick chargers at a site can cause transmission grid problems since removing large amounts of electricity on-peak over a short period from the grid can cause local brown-outs. A typical US household draws about 1.5 kWh; multi-vehicle quick charge station operating at full capacity would pull hundreds of kW of electricity which could adversely affect the local power supply if only transmission grid electricity were being used to supply the EVCS. Removing that much electricity in that amount of time from the grid would most likely result in a local brown-out.

If the EVCS infrastructure relies solely on transmission grid supplied electricity, very little net gain is made in reducing the carbon footprint in the atmosphere since over 80% of the electricity generated for the grid is from the fossil fuels of coal and petroleum which produce carbon pollutants. If a reduction in atmospheric carbon is indeed a goal of the EV movement, the EVCS infrastructure must include an alternate energy source which could include solar, wind, tidal, biomass, and others. Otherwise, the net result is only a transfer of pollution from metropolitan areas having many EVs to rural areas where the grid generators are located. The present disclosure includes a renewable energy component of solar energy which is the conversion of sunlight into electricity using PV cells. These systems can use solar panels with tracking systems to increase production. Wind and tidal systems use the kinetic energy in the moving wind or water as the fuel source.

Solar is an intermittent energy source which depends on the weather during the day and is not available at night. When sunshine illumination intensity is weak, power production is low; when illumination intensity is stronger, power production is greater. The magnitude of illumination, and thus power production, is classified into four classes including strong, moderate, weak, and very weak. Solar panels produce significant amounts of power only during direct sunlight which is about 5 hours/day. In the present application the solar energy is used directly and immediately by the EVCS. When no EVs are being charged during solar production the electricity can be stored in a battery or put into the transmission grid through a metering program which provides a credit.

Grid electricity can be stored in a storage mediums as rechargeable batteries, molten slats, pumped-storage hydroelectricity, and others. Rechargeable battery storage in the present disclosure could include storage batteries recycled from other EVs. Molten salts are an effective storage medium since they are inexpensive, with pumped-storage technology water is pumped from a lower to higher elevation reservoir. The energy is recovered when needed by releasing the water to a power generator.

As the number of EVs increase each year, the need for an EVCS infrastructure intensifies. However, a larger percentage of the electricity used by the EVCS needs to be sourced from renewable energy. If only grid sourced electricity is used there will be only a transfer of air pollutants from major population centers where most EVs are located to rural areas where the grid generators are located.

Petroleum fueled vehicles typically obtain fuel from a network of fueling stations located along major highways throughout the nation. These would be ideal locations for EVCS, but to date this has not been economically feasible. As PV and BSE technology improve this will probably change and an EVCS infrastructure be developed. The present disclosure relates to an EVCS which uses a renewable energy source supplemented with BSE to form the charging load. A computer integration system prioritizes the electrical content of the charging load by fuel source in the order of renewable, BSE, and direct grid.

Premium solar panels presently produce about 1.5 kWh daily in locations with five hours direct sunlight. To generate a significant amount of electricity for EV charging a number of solar panels would need to be on site. This disclosure places the solar panels on the station canopies since most petroleum fueling sites have canopies to protect their customers from the weather, and free ground space is very limited at existing sites. Mid-sized fueling sites of 16 linear fueling positions typically have canopies measuring around 220×20 feet. A canopy of this size would have about 4,400 square feet flat roof surface for mounting solar panels where approximately 140 solar panels could be located. Other possible surface areas for solar panel mounting include flat roofs on buildings on site as well as connecting flat roofs connecting the major canopy to these buildings.

Since solar panel output depends on direct sunlight, solar production varies depending on geographic location. Premium solar panels produce about 300 watts per hour. If a site gets 5 hours direct sun daily, solar production would be about 1500 watts or 1.5 kWh. This is about 550 kWh of electricity per year per panel, or about 75,900 kWh annually for the example site of 140 panels. In present markets this amount of electricity at commercial retail on-peak rates would be valued at about $10-15,000 per year.

A solar array at a fueling site in most locations will not produce enough electricity alone to operate a multi-vehicle EVCS, it must therefore be supplemented with another fuel source. The present discloses an integrator for forming a charging load of renewable energy and BSE where the renewable energy is used directly and at top priority. If a charging station has multiple Level 2 and Level 3 chargers, it could dispense hundreds of kWh when charging at full capacity.

When large amounts of electricity are removed from the transmission grid in a short period, a local brown-out likely occurs. The present disclosure uses BSE which is recharged off-peak when rates are cheapest, and the electricity is then used on on-peak on demand for EV charging. Battery storage technology is evolving rapidly as research and development occurs in the field.

The present disclosure uses state of the BSE technology where the on-site batteries are recharged off-peak while rates are lowest, the energy is then used on-peak for charging when rates are maybe three times higher. As previously discussed removing large amounts of electricity on-peak from the transmission grid can cause local-brown outs, using a BSE in the charging system can prevent this. The present disclosure uses a computer controlled load center to prioritize the charging load formed for the charging meters in the order of solar sourced, BSE sourced, and direct from the grid. Also in the disclosure when there is solar production and no EV charging activity the electricity is put in the grid for credit.

BRIEF SUMMARY OF THE INVENTION

The present invention relates to a microprocessor control center (MPCC) controlled EVCS, and methods thereof, which use PV generated and BSE recharged from the transmission grid to form the charging load for the charging meters in an EVCS. The major objective of the invention is to integrate and optimize the renewable energy source with the BSE source where the renewable energy source is used directly and at top priority in forming the charging load. Using a BSE can prevent local browns-out which can occur when large amounts of electricity are removed quickly on-peak. The BSE is recharged off-peak when rates are cheapest and house hold usage lowest. In a preferred embodiment the alternate energy source is solar, in other embodiments the alternate energy source could be wind, tidal, or biomass, or a combination thereof.

The EVCS uses a solar array to produce electricity where the solar panels are mounted on flat surfaces of weather canopies at petroleum fueling sites. The MPCC uses integration hardware and software to prioritize the electrical content of the aggregated charging load formed by the load center for delivery to the charging meters in the order of renewable, BSE, and direct grid which is used only when BSE is depleted. The MPCC further causes the BSE to be recharged during off-peak hours Excess solar production is put in the grid for credit.

Accordingly, the primary objective of this invention is to integrate and optimize renewable energy sources with BSE sources for forming the charging load by an EVCS.

A further objective of this invention is to provide an EVCS which prevents local brown-outs which can occur when removing too much energy from the grid during short periods on-peak when house-hold usage is high.

A further objective of this invention is to provide an EVCS which uses PV generated energy directly and at top priority with supplementation of BSE in aggregating the charging load.

A further objective of this invention is to provide an EVCS which uses transmission grid energy to supply the load center when BSE is depleted.

A further objective of this invention is to provide an EVCS which uses integrated circuits to prioritize the aggregated charging load in the order of solar sourced, BSE sourced, and direct grid sourced.

A further objective of this invention is to provide an EVCS which recharges the BSE during off-peak hours when electrical rates are cheapest and household usage lowest.

A further objective of this invention is to provide an EVCS which uses solar panels mounted on the flat surface of weather canopies at petroleum fueling sites.

BRIEF DESCRIPTION OF THE DRAWINGS

Other features of the present invention will become evident from a consideration of the following patent drawings, which form a part of the specification.

DETAILED DESCRIPTION OF THE INVENTION

Figure 1:
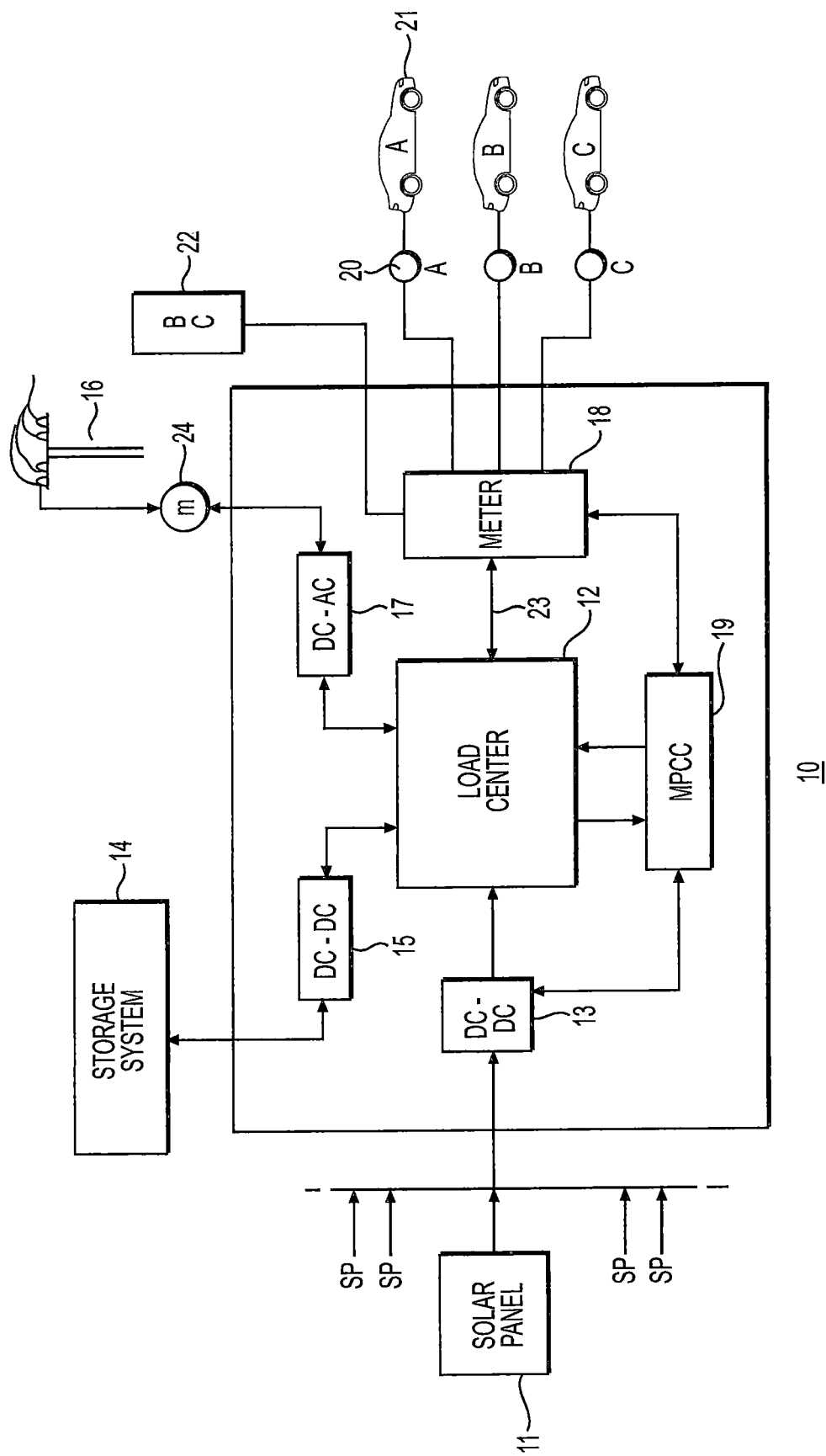
FIG. 1 is a schematic top view of the present invention having a solar panel array, a load center, a charging meter, a BSE, and a MPCC for controlling the charging process.

Referring now to the drawings, and first to FIG. 1, there is shown a schematic diagram of the EVCS, generally designated 10, in accordance with the present invention for charging EVs. The EVCS 10 has an array of solar panels 11 for generating PV electricity for charging EVs. The solar panel 11 is connected to a load center 12 through a DC-DC converter 13. The converter 13 stabilizes the electricity at a preset value for delivery to the load center 12. The converter 13 also has a bidirectional connection to the MPCC 19.

The load center 12 can also receive electricity from the BSE 14 which is connected to the load center 12 through DC-DC convertor 15 which stabilizes the electricity at a preset value. The load center 12 can further receive electricity from the transmission grid 16 through AC-DC invertor 17 which inverts and stabilizes electrical flow between the two. Meter 24 tracks flow of electricity between the two. Another function of the load center 12 is to transfer electricity from the grid 16 to the BSE 14 where it is temporary stored and released on demand to charge EVs. The BSE 14 is recharged from the grid 16 late night off-peak when rates are cheapest and household usage lowest. A real-time controller in the MPCC 19 controls the timing for recharging the BSE.

The load center 12 can receive energy from the solar cell 11, BSE 14, and directly from the grid 16. The load center 12 aggregates electrical power from these sources to form an aggregated charging load 23 for delivery to the charging meters 18. Algorithms in the MPCC 19 cause the load center 12 to prioritize the energy source used in forming the aggregated charging load in the order of solar, BSE, and direct grid. The charging meters 18 distributes the load to the electric vehicles 21(ABC) through connectors 20(ABC). There are several charging spaces to service vehicles 21(ABC). The charging meter 18 tracks the identification of each vehicle 21(ABC) connected to the system from charging. The data for each vehicle can include vehicle ID, the date and time of charging, the amount of power delivered, as well as other pertinent information. This data is transferred from the charging meter 18 to a billing center 22 which may include an attendant in an adjacent service building, or it may be uploaded to a distant computer processing system.

The charging meter 18 assesses in real-time the status of the charging process for each charging spaces 21(ABC). It determines when there is a new connection for a charge, the position, and when the charging is complete. The charging meter 18 determines the optimal voltage and current needed to perform the charging task at each charging space. For illustrative purposes, there are three charging spaces 21ABC in FIG. 1, however, the three spaces are not meant to be restrictive since typically there are several charging spaces. Level 1 chargers are supplied 120V (14 Amp) current, Level 2 chargers are supplied 220 V (30 Amp) current; Level 3 chargers provide a quicker charge from an DC electrical source through for example VDE-ARE or ADE-ARE connectors.

MPCC 19 controls several task in the EVCS 10. It has a bi-directional connection to the load center 12, the charging meter 18, and the DC-DC convertor 13. It receives information from the charging meter 18 on the status of the charging mode for each charging space 21 though feedback signals. The MPCC 19 receives power production information from the DC-DC convertor 13 including the amount of electricity being produced by the solar array. The MPCC 19 causes the load center 12 to prioritize the aggregation of the charging load for delivery to the charging meter 18 by electrical energy source where the priority is solar sourced 11, BSE 14 sourced, and direct grid 16 sourced energy only when BSE is depleted.

The MPCC 19 includes standard computer hardware as a MP, nonvolatile RAM with code, static RAW with data, ROM for operating the system, and bidirectional interfaces for modem connection and connection to other components of the charging system. It stores and processes look-up tables of data points. Algorithms set forth computational procedures to control several task including prioritizing the aggregated charging load to the charging meter 18 according to electricity source. The MPCC 19 includes integrated circuits (IC) which typically consist of small squares of silicon imprinted with patterns containing the transistors, resistors, LEDs, and other electronic parts to perform these task.

The load center 12 can receive energy from the solar cell 11, the BSE 14, and the grid 16. A major feature of the system is it prioritizes the energy source used for aggregating the charging load. The MPCC 19 tracks the ID of each EV(ABC) connected for charging gathering data as amount of current delivered, time and date, and status of the charge. There is a bi-direction and exchange of transaction data with the billing system 22. The charging meter 18 bi-directionally exchanges charging information with the MPCC 19. The information is used to assess the status of the charge including optical voltage and amps during the charge and when the charge is complete.

Grid storage systems are often used to store electrical energy when grid production exceeds demand, and used when grid demand is greater than production. In the present disclosure the electrical energy is taken from the grid, temporary stored, and then used on demand to charge EVs. This has two major advantage: the energy is removed from the grid off-peak when electrical rates are low and the stored energy is then used on-peak on demand when rates are higher allowing the station to generate profitable revenue, and it prevents local brown-outs which occur when large amounts of electricity are removed from the grid on-peak when household usage is high.

The present disclosure uses Li-ion technology for BSE 14. While there is some energy lost during the storage process, savings from purchasing the energy off-peak at low rates and selling on-peak at high rates helps with the economics of the lost. Technology exist for the transfer of energy from the grid to BSE 14 where the AC-DC invertor 17 is a key component. The MPCC 19 controls the time of transfer which is usually between 12-3:00 AM. The timing of transfer and Li-ion storage are not meant to be restrictive.

The load center 12 delivers the charging load 23 to the charging meters 18 which performs the charging task. The charging meters 18 individually deliver electricity to the charging connectors 20(ABC) which connect to EV 21(ABC). It tracks the amount of electricity delivered to each vehicle during the charging session. The charging meter 18 is further connected to a billing system 22 for collecting for the electricity dispensed.

The charging meters 18 bi-directionally exchanges feedback information through individual connectors 20(ABC) for each charging space 21(ABC). This information includes new connections for charge, optimal voltage and current, and when the charge is complet. Other data transferred may include the status of the charge, ID of the vehicle, date and time, and amount of energy dispensed. The information is processed by the MPCC 19 and sent to a billing center 22.

Figure 2:
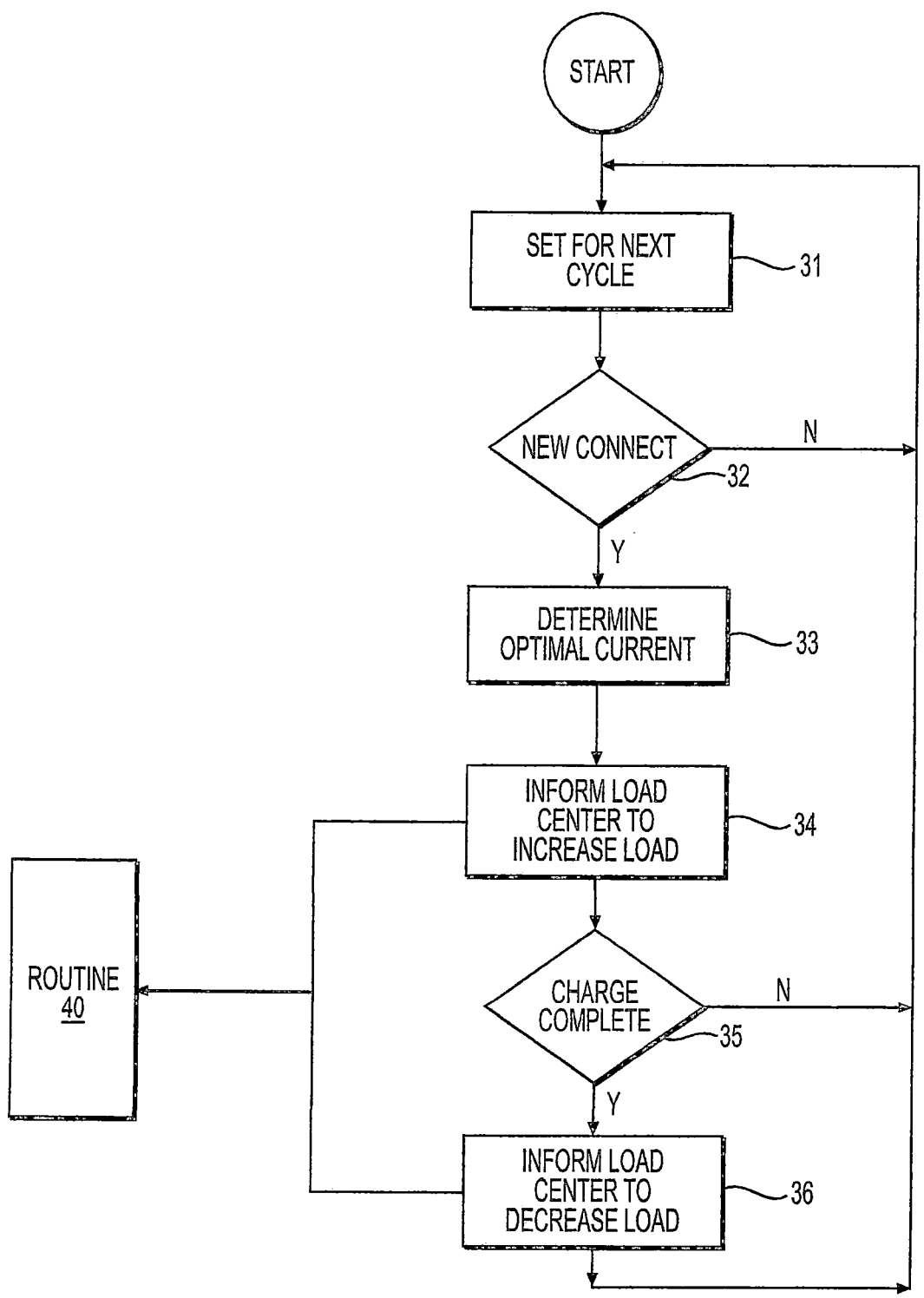
FIG. 2 is a flow chart of the computational procedures for controlling the charging process while an EV is being charged.

Referring now to FIG. 2, there is shown a flow chart, generally designated 30, illustrating the mathematical procedures (algorithms) for processing the information from the charging center 18 to be processed by the MPCC 19. This algorithm generally controls the charging process. Instructional block 31 causes the routine to set for the next cycle. In decision block 32, the MPCC 19 determines if there is a new connection at a connector 20(ABC). A negative decision in block 32 causes an exit from the loop whereby it sets for another cycle in block 31. A positive decision in block 32 causes MPCC 19 to defer to block 33. Instructional block 33 causes MPCC 19 to determine the optimal current and amount for the new connect which is provided to block 34 which informs the load center 12. Block 34 flows to decision block 35 which determines if the charge is complete. A negative decision causes an exit from the loop whereby it sets for another cycle. A positive decision defers to instructional block 36 which informs the load center 12 to decrease the charging load (through routine 40). Block 36 ends the routine whereby it loops back to set for the next cycle 31. Since this routine feeds information to another routine it is a subroutine of the charging process.

Figure 3:
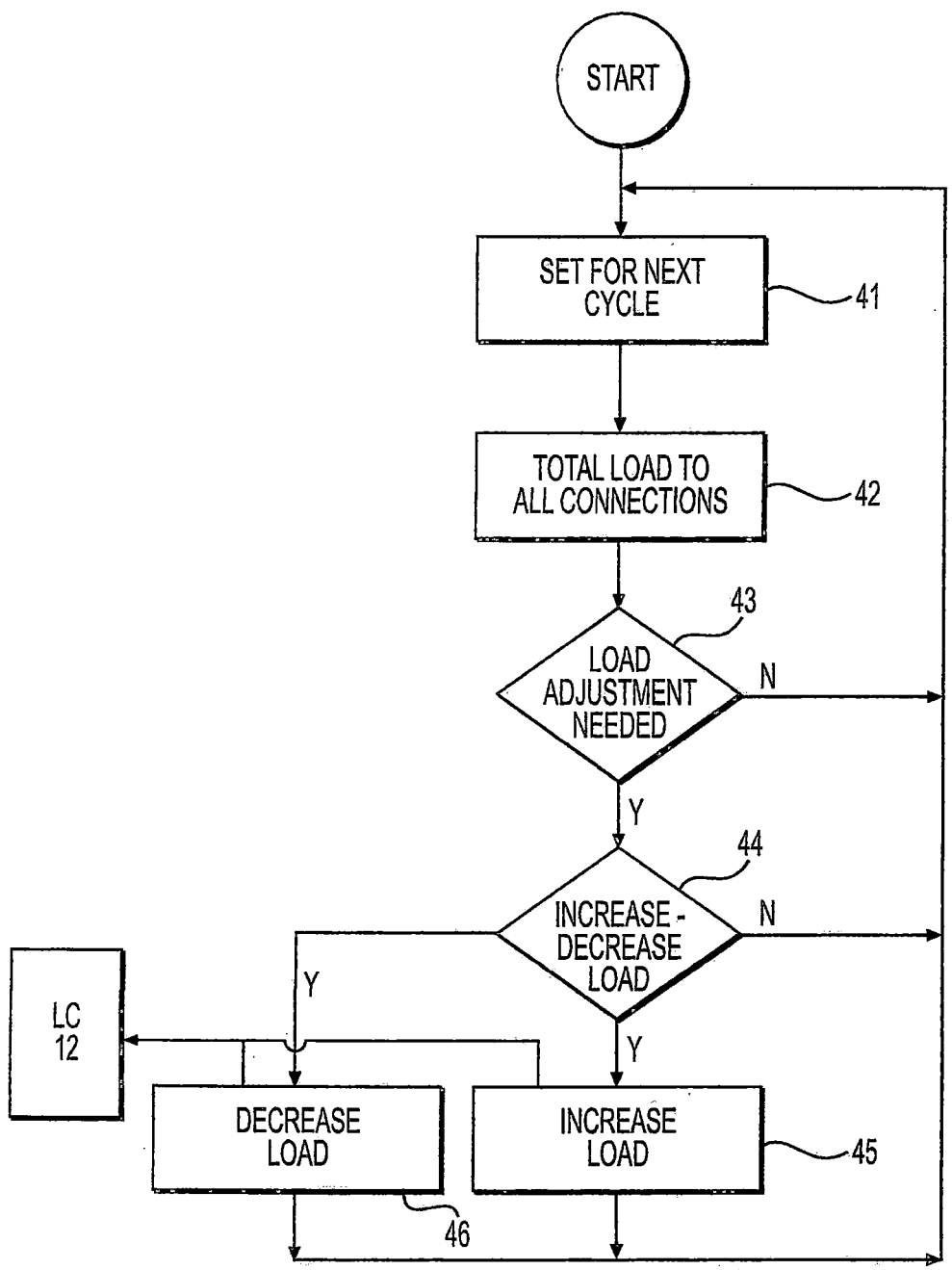
FIG. 3 is a flow chart of the computational procedures for determining energy needed for aggregating the charging load.

Referring now to FIG. 3, there is shown a flow chart, generally designated 40, showing how the MPCC 19 determines the total amount of current needed for the aggregating the charging load 23. Block 41 sets the routine for the next cycle. Block 42 causes the MPCC 19 to determine the total current needed for all connectors 20(ABC), information made available by routine 30. Block 42 then defers to decision block 43 which determines if a load adjustment is needed. A negative decision causes an exit from the loop whereby the MPCC 19 is set for the next cycle. A positive decision refers to block 44 which determines if an increase or decrease is needed for aggregating the charging load. Instructional block 45 causes an increase in the load and block 46 causes a decrease in the load. This information is transferred to the load center 12. The routine loops back to reset for another cycle.

The load center 12 can receive electrical energy from the solar cell 11, BSE 14, and the grid 16. The MPCC 19 prioritizes the electrical makeup of the aggregated charging load 23 by the following order: solar sourced, BSE sourced, and grid sourced. The net effect is that solar production is used directly and first in aggregating the charging load which is then supplemented by BSE when solar production is insufficient; grid energy is used only when BSE is depleted.

Figure 4:
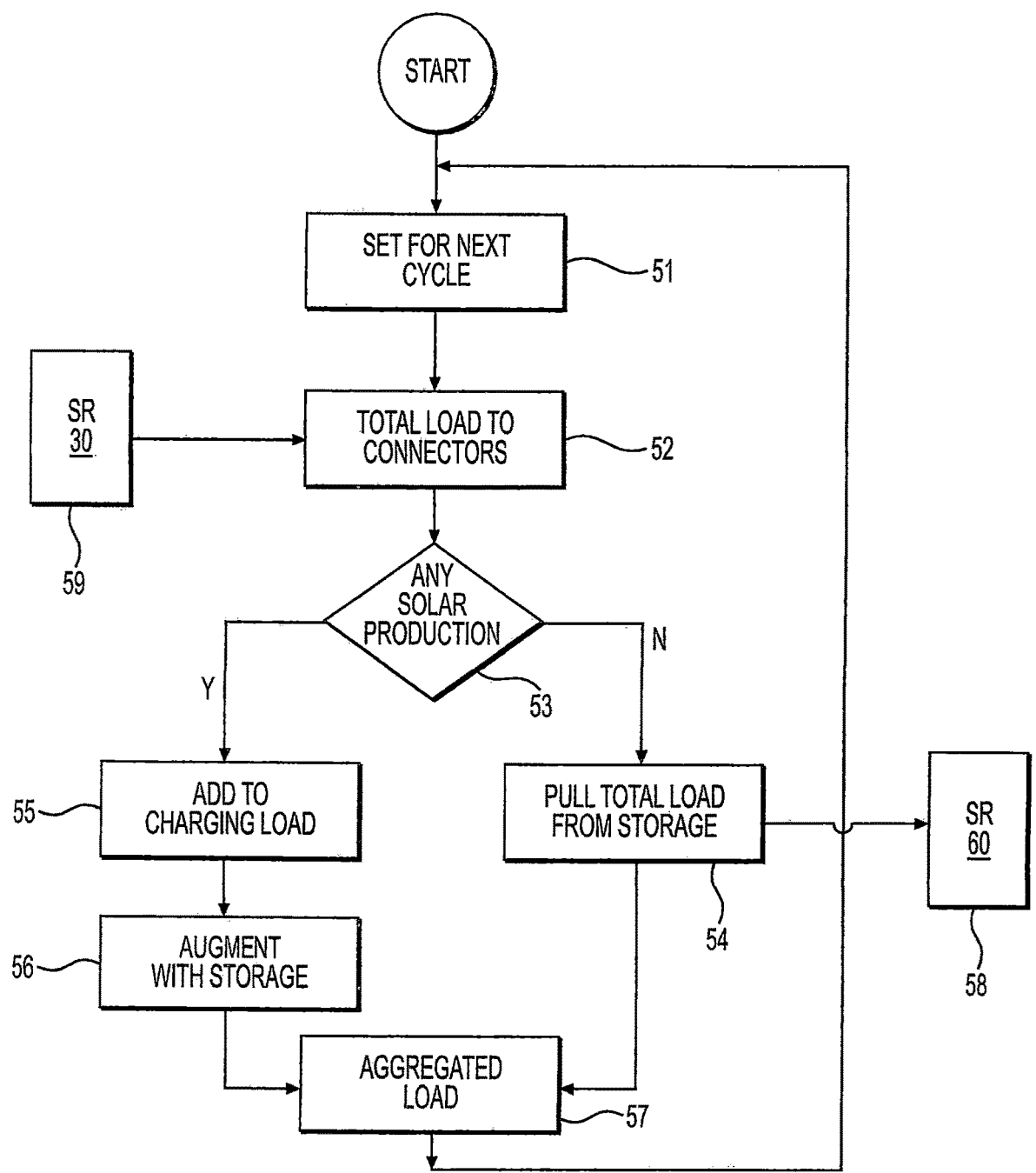
FIG. 4 is a flow chart of the computational procedures for prioritizing the aggregated charging load from solar energy, BSE, and direct grid energy.

Referring now to FIG. 4 there is shown a flowchart, generally designated 50, showing the algorithm for aggregating the charging load 23. Block 51 causes the MPCC 19 to set for next cycle. Instructional block 52 instructs MPCC 19 to total all individual load needs from charging meter 18 for delivery to EVs 21(ABC). This summed total of all individual load needs is expressed as an aggregated charging load 23, derived from information made available from routine 30. Block 52 defers to decision block 53 which determines if there is any solar production. This information is available from DC-DC convertor 13. A positive decision defers to instructional block 55 which instructs MPCC 19 to add any solar production to aggregation of the charging load 23. Block 55 defers to instructional block 56 which causes MPCC 19 to supplement solar production with BSE 14 to satisfy total load needed to all connections 20(ABC). Block 56 defers to block 57 with load need information. A negative decision by decision block 53 defers to block 54. Block 54 gives instructions to pull energy for charging load from BSE 14, where after block 54 defers to block 57 with information on the aggregated charging load 23. The routine sets for the next cycle in block 51. Referring back to block 54, when BSE 14 is depleted the routine defaults to block 58 which diverts the process to flow chart 60.

Figure 5:
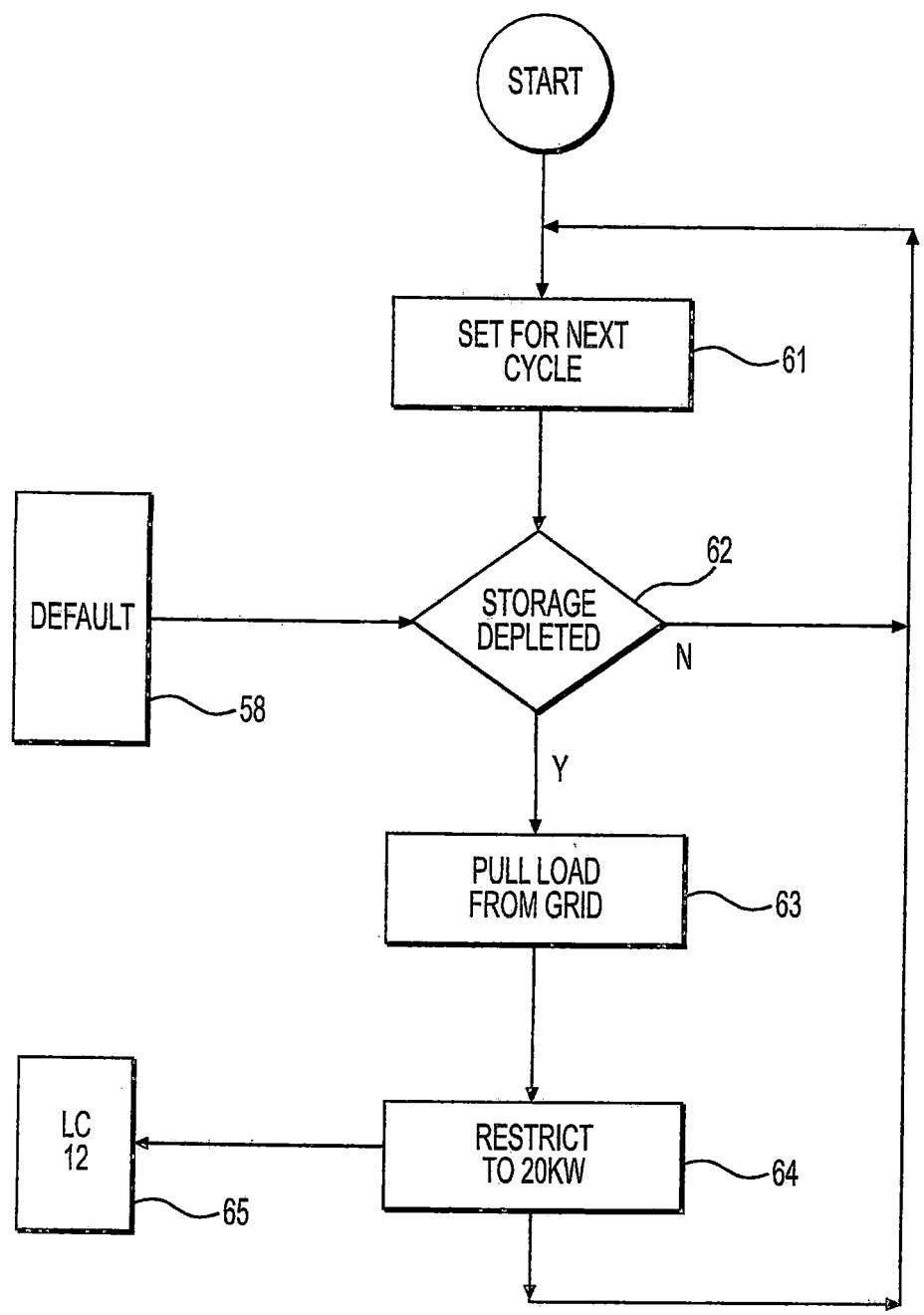
FIG. 5 is a flow chart of the computational procedures for instructing the load center to use direct grid energy only when BSE is depleted.

If the BSE 14 is depleted of electrical energy and more is needed for charging, the aggregating process in block 54 defaults which directs to default block 58 which defers to flow chart 60. Referring now to FIG. 5, there is shown the flow chart, generally designated 60, with algorithm for causing the load center 12 to pull electricity directly from the transmission grid 16 to supply the charging load. Default block 58 defers to decision block 62 which confirms BSE 14 is depleted of electrical energy. A positive decision in block 62 defers to instructional block 63 which instructs the load center 12 to pull electricity directly from the grid 16 to supply energy for aggregation of charging load 23; block 63 thereafter defers to block 64 which can put a variable limit of kW of pull from the grid. Instructional block transfers this information to the load center 12 through block 65, and thereafter exits to reset for another cycle in block 61. The variable limit of kW pull from the grid is to prevent local brown-outs; the limit can be adjusted up or down according to the local grid conditions. Referring back to decision block 62, a negative decision causes an exit from the loop which resets the routine for another cycle in block 61. The MPCC 19 is programmed to recharge the BSE 14 from the transmission grid 16 off-peak, usually between 12 to 3 AM. After this time the default 58 is turned off and the MPCC 19 returns to aggregating the charging load through the regular process as shown in flow chart 30.

The MPCC 19 uses a real-time process to cause energy to flow from the grid 16 to the load center 12, where the energy flows through AC-DC invertor 17 which conditions the energy for delivery to BSE 14. Meter 24 tracks and records the flow of current between the two. The energy is transferred from the load center 12 to the BSE 14 through DC-DC converter 15 until the system is fully recharged. The 12-3:00 time period is not restrictive. The stored energy is used then on-peak on demand.

In a preferred embodiment of the present invention, the solar panels 11 are mounted on the flat surfaces of canopies of petroleum fueling sites which are mostly located in high density areas where ground surface area is limited. These fueling sites have canopies to protect their customers from adverse weather. Typically sixteen fueling position fueling sites have canopies measuring around 20 by 220 feet of flat surface ideal for mounting canopies since panels can be positioned toward the sun. Mounting panels on canopies is not meant to be restrictive; other surfaces including ground surface could be used in alternate embodiments.

The present disclosure uses solar panels (PV generators) mounted on petroleum fueling site weather canopies as the renewable energy source; certainly other alternate fuels including wind, water, and bio could be used as the renewable energy. The main objective of the invention is to integrate and optimize the renewable generated energy with the BSE energy to form the charging load. The novelty of the system is that the renewable generated energy is used directly and at top priority in the aggregation of the charging load which is supplemented with BSE energy when renewable production is insufficient. The system further causes the charging load to be formed from grid sourced energy when BSE is depleted.

The present invention may, of course, be carried out in ways other than those herein set forth without parting from the spirit and essential characteristics of the invention. The present embodiments are therefore to be considered in all respects as illustrative and not restrictive, and all changes coming within the meaning and equivalency range of the appended claims are intended to be embraced therein. The term "at least one" is a term commonly used in claim language and usually allowed by the USPTO meant to encompass a combination having either one or more than one stated elements.

What is claimed is:

1. A microprocessor control center (MPCC) implemented means for detecting, optimizing, and prioritizing energy sources used in aggregating a charging load by an electric vehicle charging station (EVCS) functionally connected to at least one photovoltaic (PV) generator, battery stored energy (BSE), and the transmission grid, comprising: determining if a new at least one electric vehicle (EV) connection has been made, ascertaining the optimal electrical energy level requested by said new at least one EV connection, instructing a load center to increase electrical input to said charging load in compliance with said optimal electrical energy level requested, determining when the electrical charging of said new at least one electrical vehicle is complete, instructing said load center to adjust said charging load accordingly, summing of all said optimal electrical energy levels being delivered to all said at least one EV indicated by an aggregated charging load value, determining if an adjustment in the existing charging load is needed, adjusting said existing charging load as indicated by said aggregated charging load value by increasing or decreasing electrical input to said charging load, determining if any said PV electricity is being produced and the amount, adding said PV produced electricity to said aggregated load to satisfy electrical needs of said aggregated charging load, and determining if PV generated electricity being produced is sufficient to satisfy electrical needs of said aggregated charging load, and if insufficient pull supplementally needed electricity for said aggregated charging load from said BSE.

2. The MPCC implemented means of claim 1, further including instructions that when executed cause said MPCC to determine when said BSE is depleted of stored electricity and thereafter causing said load center to pull electricity directly from said transmission grid to meet electrical needs of said aggregated charging load.

3. The MPCC implemented means of claim 1, further including instructions that when executed cause said load center to transfer electricity from said transmission grid to said BSE at pre-determined times.

\* \* \* \* \*